Patented Sept. 3, 1935

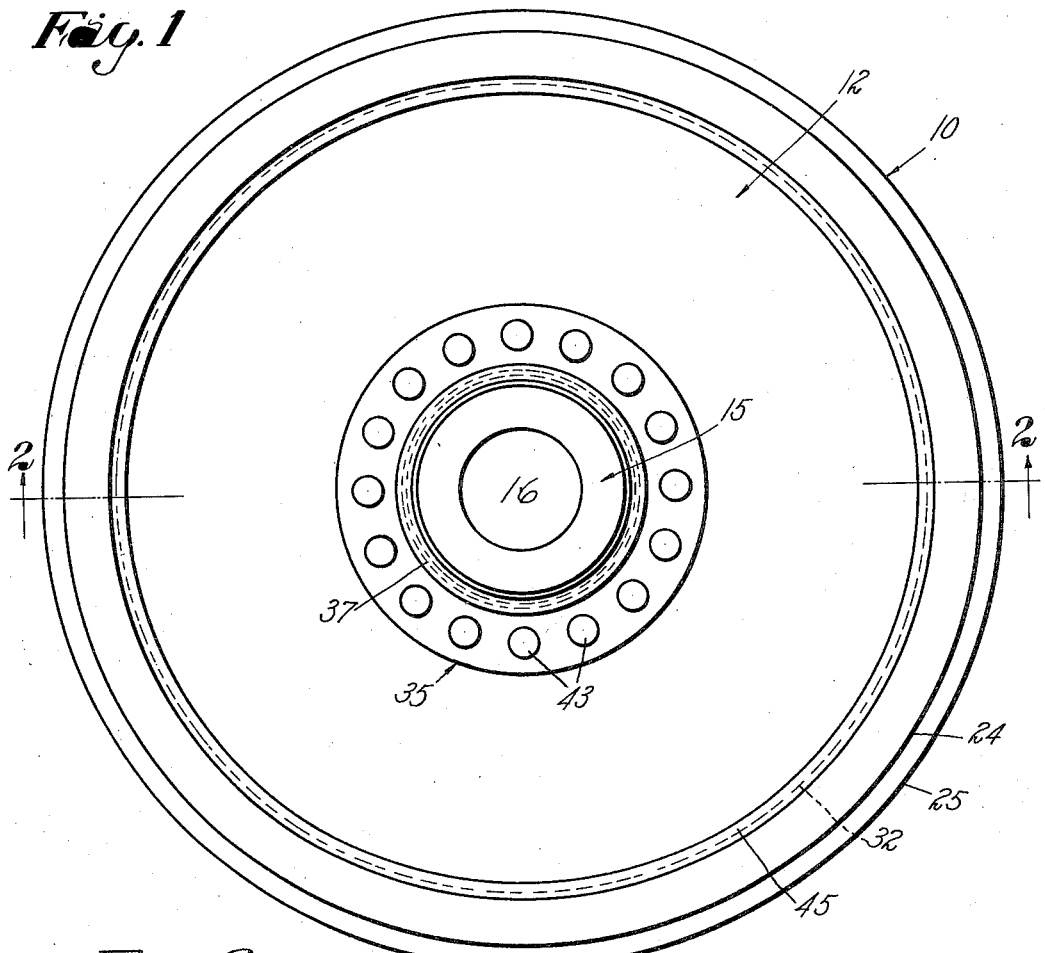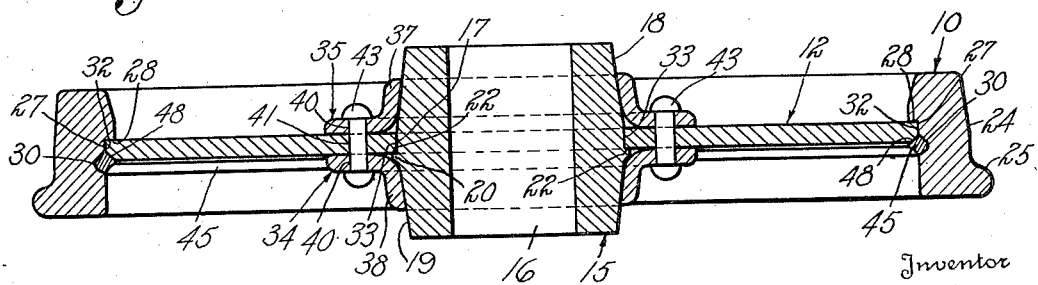

2,013,139

UNITED STATES PATENT OFFICE 2,013,139

VEHICLE WHEEL

Charles De Los Rice, West Hartford, Conn.

Application January 18, 1934, Serial No. 707,202

4 Claims. (Cl. 295—22)

This invention relates to improvements in vehicle wheels, and particularly to improvements in vehicle wheels of a resilient nature, and has for its principal object the provision of a vehicle wheel which is exceptionally strong and sturdy and at the same time is resilient and light in weight.

A further object is the provision of a vehicle wheel of the character described which is extremely simple and economical to manufacture and assemble.

A still further object lies in the provision of a vehicle wheel of the character described from which the rim or tire may be readily removed without dismounting the wheel from the vehicle.

Other objects and advantages of the invention will appear as the description proceeds.

In the accompanying drawing, I have illustrated a preferred mechanical embodiment of the idea of the invention. The drawing, however, is not to be taken as limiting the invention the scope of which is to be measured entirely by the scope of the subjoined claims.

In the drawing,

Fig. 1 is an elevational view of a vehicle wheel constructed according to the idea of this invention; and Fig. 2 is a sectional view taken on the line 2—2 of Fig. 1.

Referring to the drawing in detail, it will be observed that my improved vehicle wheel is composed of three main elements, namely, a rim or tire generally indicated at 10, a disk or web generally indicated at 12, and a hub generally indicated at 15.

Referring now to Fig. 2, it will be observed that the hub member 15 is provided with an axial aperture 16 extending therethrough for the accommodation therein of a wheel-carrying end of the vehicle axle. The ends of the hub member are flat and lie in planes transverse to the axis of the aperture 16. The intermediate or central portion of the hub member 15 has a circumferential dimension greater than the ends thereof, and the circumferential surface of the hub member is tapered from each end towards the center thereof, as indicated at 18 and 19. The hub member comprises, in effect, a central cylindrical portion 17 terminating at one end in a radial shoulder and two frustro-conical portions 18 and 19 located one upon each side of the cylindrical portion 17 and positioned with their larger ends abutting the cylindrical portion and their smaller ends terminating in the respective ends of the hub member. An integral annular ring 20 is provided upon the exterior of the hub member and has a radial surface or shoulder 22 disposed at a distance from the transverse center of the hub member equal to one-half of the thickness of the disk member 12. The radial edge of the ring 20 opposite the shoulder 22 is curved or tapered for a purpose to be presently described. The outer ring 10 is provided with a tread portion 24 adapted to run upon the rails of a railroad and with a flange portion 25 adapted to maintain the wheel against lateral thrust upon the rails. Interiorly thereof, this ring member is provided with a groove 27 having a radial wall or shoulder 28 spaced from the transverse center of the ring at a distance equal to one-half of the thickness of the disk 12, at the opposite side of the transverse center of the ring 10 from the flange 25. The opposite side of the groove 27 is provided with an additional curved groove or annular indentation 30 for a purpose to be presently described.

The web or disk member 12 has a circular circumference, as indicated at 32 in Fig. 1, and is provided with a central circular aperture 33 the diameter of which is just sufficient to permit the disk member to be pressed over the exterior surface of the hub member 15 and come to rest against the annular shoulder 22. It will be observed that when the disk member is so fitted over the hub member the shoulder 22 of the annular collar 20 serves to locate the disk member centrally upon the hub member in a plane perpendicular to the axis of the aperture 16. For the purpose of rigidly securing the disk member upon the hub member, I have provided a pair of rings 34 and 35 of substantially L-shaped cross section and similar in all respects, which are preferably shrunk upon the hub member by making them with an internal circumference slightly less than the corresponding outside circumference of the hub member and expanding them by heat before they are inserted in place upon the hub member. By referring to Fig. 2, it will be observed that one of the flanges, as indicated at 37 and 38, of each of these ring members is disposed at such an angle to the corresponding flange as to make the inner surfaces of the flange members 37 and 38 parallel to the tapered outer surfaces of the hub member 15 and at the same time to make the surfaces of the corresponding flanges of these ring members parallel to the opposite surfaces of the disk member 12. In assembling the elements of the wheel the web member 12 is first pressed upon the hub member so that the web member rests firmly against the annular shoulder 22. The rings 34 and 35 are then heated and placed upon the hub member so that their respective flange portions are in contact with the web member and the hub and are then allowed to cool. Apertures as indicated at 40 and 41 are drilled through the rings and the web member after they are assembled in operative relation and rivets 43 are then inserted through the apertures and upset to hold the members firmly in assembled relation. Preferably the ends of the apertures are countersunk to favor the heads of the rivets. By reason of the tapered surfaces of the hub member 15 and the shrunk fit of the rings upon the hub member the web member will be firmly secured to the hub member and maintained true to the axis of rotation of the hub. The radial surface of the ring 20 opposite the shoulder 22 is so curved or tapered as to be clear of the inner surface of the associated ring member 34.

In order to firmly secure the ring or tire member 10 upon the periphery of the web or disk member 12, I have provided a retaining member 45 in the form of a strip of ductile metal of substantially rectangular cross section, one edge of which is located coincident with the periphery of the ring. This ring is rolled or tooled into the annular groove 30 to wedge between this groove and the adjacent edge of the disk member 12 which is slightly beveled, as indicated at 48, to provide a large bearing surface for the disk member upon the ring 45.

It will be noted that the ring 45 is disposed upon the same side of the disk 12 as the flange 25 and, as the flange 25 is ordinarily positioned at the inner side of the wheel, it is apparent that upon removal of the ring 45 the tread ring 10 or tire member of the wheel may be withdrawn outwardly from the wheel and that, therefore, this tire may be removed from the wheel without the necessity of first removing the wheel from the axle.

The ring or disk 12 is preferably formed from a relatively thin plate of tempered steel having a high modulus of elasticity, thereby giving the necessary flexibility or resiliency to the wheel. The hub member 15 and the tire 10 may be formed of hard steel and, as these structures are rigid, it is not necessary that their modulus of elasticity be as high as that of the disk member 12.

While I have illustrated and described a preferred mechanical embodiment of the idea of the invention, it is to be be understood that the invention is not limited thereby and is to be measured entirely by the scope of the appended claims.

Having now described my invention so that others skilled in the art may clearly understand the same, what I desire to secure by Letters Patent is as follows:

I claim as my invention:

1. A vehicle wheel comprising a hub member having tapered outer surfaces, a web member, and a tire member, means for securing said web member on said hub member comprisng an annular shoulder midway the length of said hub member against which the web member is adapted to abut, rings of angular cross section having flanges adapted to bear upon said tapered surfaces of said hub member and flanges adapted to bear against and rigidly secured to the opposite sides of said web member.

2. A vehicle wheel comprising a hub member having tapered outer surfaces, a circular web member having a concentric aperture therein and for receiving said hub member, and a tire member secured on the periphery of said web member, means for securing said web member on said hub member comprising an annular shoulder midway the length of said hub member against which the web member is adapted to abut, a pair of rings shrunk on said hub member and bearing in wedging relation against the tapered surfaces of said hub member, said rings being positioned one upon each side of said web member and rigidly secured thereto, and rivets inserted through apertures provided in said rings and said web member after the same have been assembled in operative relation.

3. A vehicle wheel comprising a hub member having an intermediate cylindrical portion and a frustro-conical portion upon each side of said cylindrical portion, a circular web member having a concentric aperture for receiving the cylindrical portion of said hub member, and a tire member secured on the periphery of said web member, means for securing said web member on said hub member comprising a ring bearing on each frustro-conical portion and against said web member, said rings being rigidly secured to said web member upon opposite sides thereof by rivets extending through apertures provided in said rings and said web member after the same have been assembled in operative relation.

4. A vehicle wheel comprising a hub member having an intermediate cylindrical portion terminating at one end in a radial shoulder and a frustro-conical portion upon each side of said cylindrical portion, a circular web member having a concentric aperture for receiving the cylindrical portion of said hub member, and a tire member secured upon the periphery of said web member, means for securing said web member on said hub member comprising a ring of angular cross section shrunk upon each of said frustro-conical portions and bearing in wedging relation thereagainst, said rings being rigidly secured to said web member upon opposite sides thereof to maintain said web member against said radial shoulder and in the plane of the radial axis of said hub member.

CHARLES DE LOS RICE.